(12) United States Patent
O'Loughlin

(10) Patent No.: US 7,196,917 B2
(45) Date of Patent: Mar. 27, 2007

(54) PFC PRE-REGULATOR FREQUENCY DITHERING CIRCUIT

(75) Inventor: Michael J. O'Loughlin, Nashua, NH (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/210,032

(22) Filed: Aug. 23, 2005

(65) Prior Publication Data
US 2007/0019446 A1    Jan. 25, 2007

Related U.S. Application Data

(60) Provisional application No. 60/702,031, filed on Jul. 22, 2005.

(51) Int. Cl.
*H02M 1/12* (2006.01)
*H02M 1/14* (2006.01)

(52) U.S. Cl. .................. 363/41; 323/300; 323/303

(58) Field of Classification Search ............ 363/41, 363/299, 300, 303
See application file for complete search history.

(56) References Cited

U.S. PATENT DOCUMENTS

| 4,858,052 | A | * | 8/1989 | McDonnal | 361/18 |
|---|---|---|---|---|---|
| 5,268,832 | A | * | 12/1993 | Kandatsu | 363/95 |
| 5,327,071 | A | * | 7/1994 | Frederick et al. | 323/299 |
| 5,396,165 | A | * | 3/1995 | Hwang et al. | 323/210 |
| 5,892,354 | A | * | 4/1999 | Nagao et al. | 323/299 |
| 5,982,151 | A | * | 11/1999 | Nagai et al. | 320/141 |
| 6,778,416 | B2 | * | 8/2004 | Bruno | 363/89 |
| 7,012,413 | B1 | * | 3/2006 | Ye | 323/284 |

* cited by examiner

*Primary Examiner*—Bao Q. Vu
(74) *Attorney, Agent, or Firm*—W. James Brady III; Frederick J. Telecky Jr.

(57) ABSTRACT

A circuit and method of dithering the switching frequency of an off-line power factor corrected (PFC) pre-regulator. The circuitry used to dither the frequency is advantageously accomplished by taking advantage of the PWM's internal timing circuitry. This invention reduces narrow band EMI and eliminates the need to provide specialty PWM controllers to achieve dithering.

6 Claims, 3 Drawing Sheets

US 7,196,917 B2

PFC PRE-REGULATOR FREQUENCY DITHERING CIRCUIT

CLAIM OF PRIORITY

This application claims priority of U.S. Provisional Patent application Ser. No. 60/702,031 filed Jul. 22, 2005 entitled "PFC Pre-Regulator Frequency Dithering Circuit", the teaching of which are incorporated herein by reference.

FIELD OF THE INVENTION

The present invention relates to pulse width modulators (PWMs).

BACKGROUND OF THE INVENTION

Many off-line power converters implement a pulse width modulator to manage the power conversion. In off-line AC to DC converters, dithering the PWM frequency has proven to reduce electromagnetic interference (EMI) by changing it from narrowband to broadband.

SUMMARY OF INVENTION

The present invention achieved technical advantages as a circuit and method of dithering the switching frequency of an off-line power factor corrected (PFC) pre-regulator. The circuitry used to dither the frequency is advantageously accomplished by taking advantage of the PWM's internal timing circuitry. This invention reduces narrow band EMI and eliminates the need to provide specialty PWM controllers to achieve dithering.

The frequency dithering technique reduces the narrow-band EMI by spreading out the noise spectrum of the power supply. There are limitations on how much the oscillator frequency (fs) can be dithered. Some of the limiting factors are switching losses and magnetic design. To keep the boost inductor as small as possible and to keep the switching losses in check the frequency dithering should be no more than about 20$ to 30% of the fundamental frequency.

DETAILED DESCRIPTION OF THE PRESENT INVENTION

Figure 1:
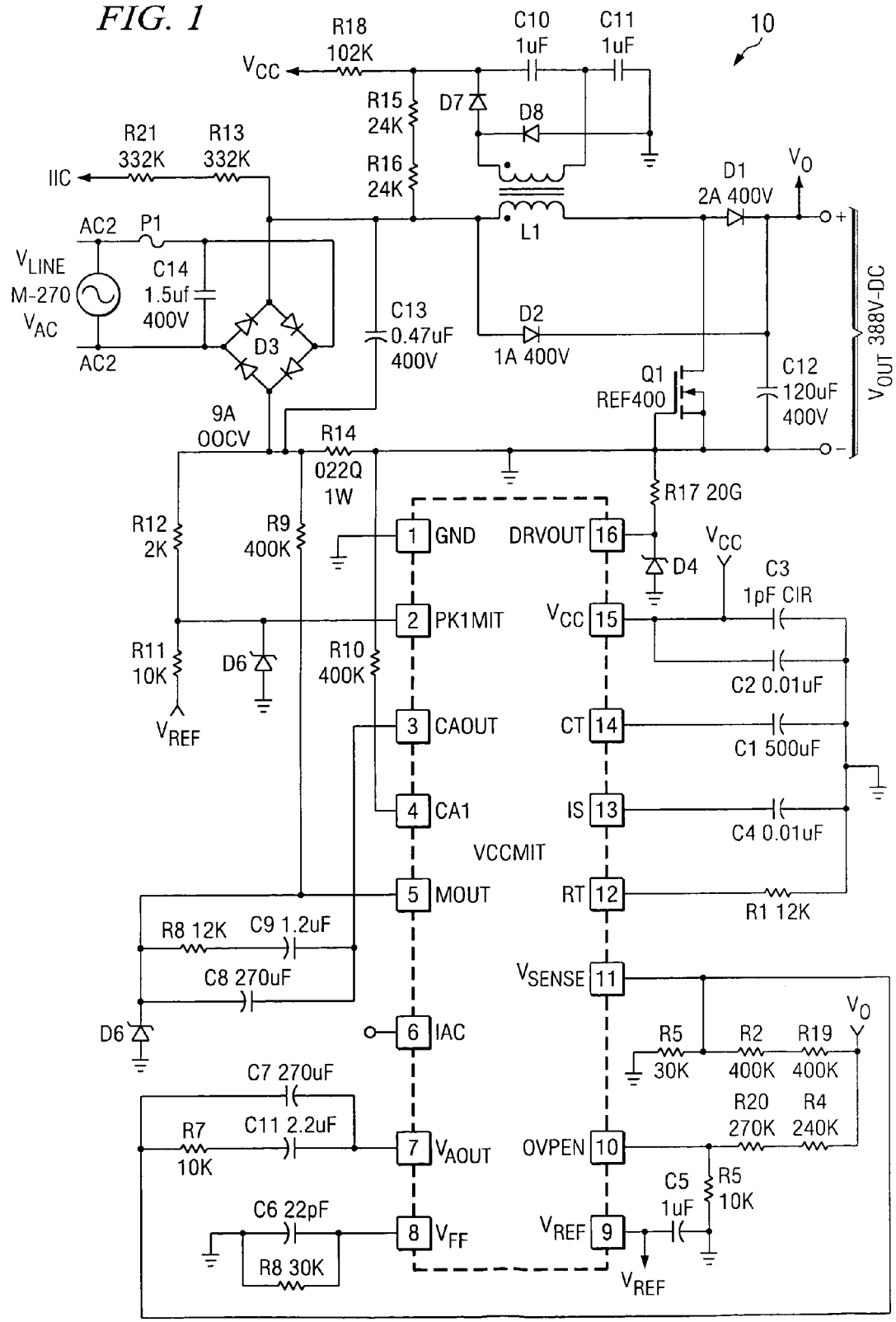
FIG. 1 is a block diagram of a typical PFC boost regulator with a PWM controller.

FIG. 1 is a schematic of a 250 W AC to DC off-line power converter 10 with PFC that is designed for a universal input voltage. A good portion of conventional PWMs develop timing through internal circuitry, and it is this internal circuitry that is taken advantage according to the present invention to dither the converter's switching frequency to lower narrowband EMI.

Figure 2:
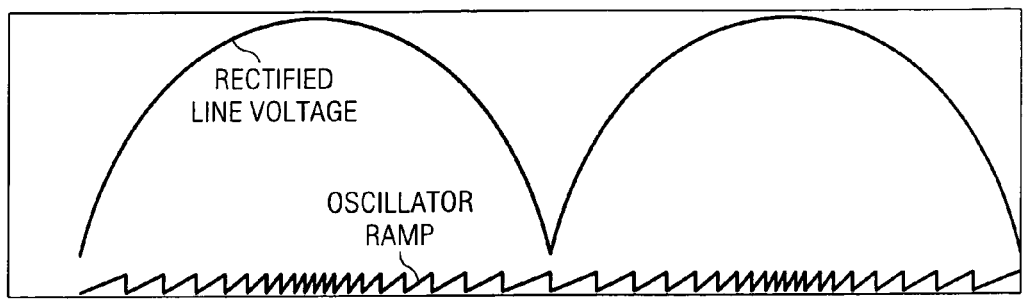
FIG. 2 depicts the desired oscillator frequency fs versus changes in the input sine wave.

The duty cycle varies from 80% to 100% as a function of the input voltage sine wave. At input line crossover, the oscillator frequency fs is at 80% of its maximum and increases and decreases proportionally with changes in the line voltage. FIG. 2 shows how frequency fs varies with input voltage sine wave.

Figure 3:
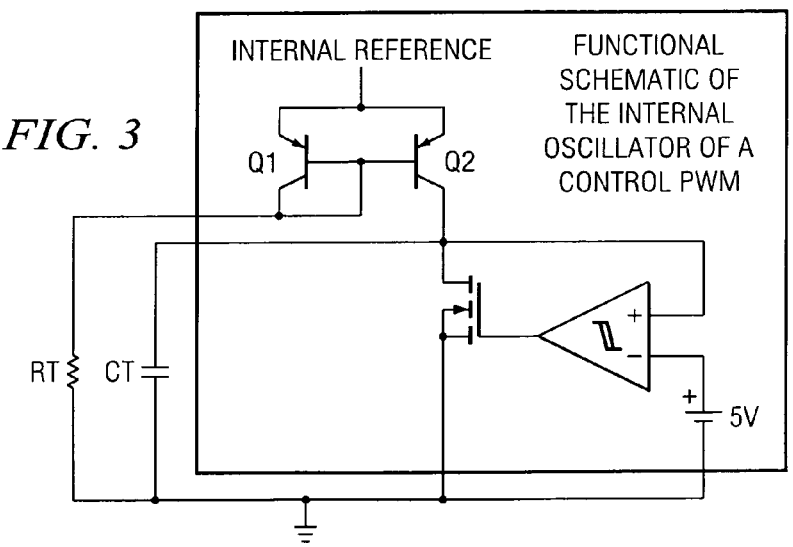
FIG. 3 depicts a functional block diagram of internal timing circuitry of the PWM.

FIG. 3 shows a functional block diagram of the internal timing circuitry of converter 10 that generates the oscillator signal of the PWM controller in FIG. 1. The timing is set up by a resistor R and capacitor C and a comparator. Resistor RT sets the charging current in the timing capacitor (CT) through the current mirror formed by transistors Q1 and Q2. An internal comparator with hysteresis controls when capacitor CT charges and discharges, forming the PWM timing. To dither the switching frequency of the PWM, circuitry is added to the PWM to modulate capacitor CT's charging current.

Figure 4:
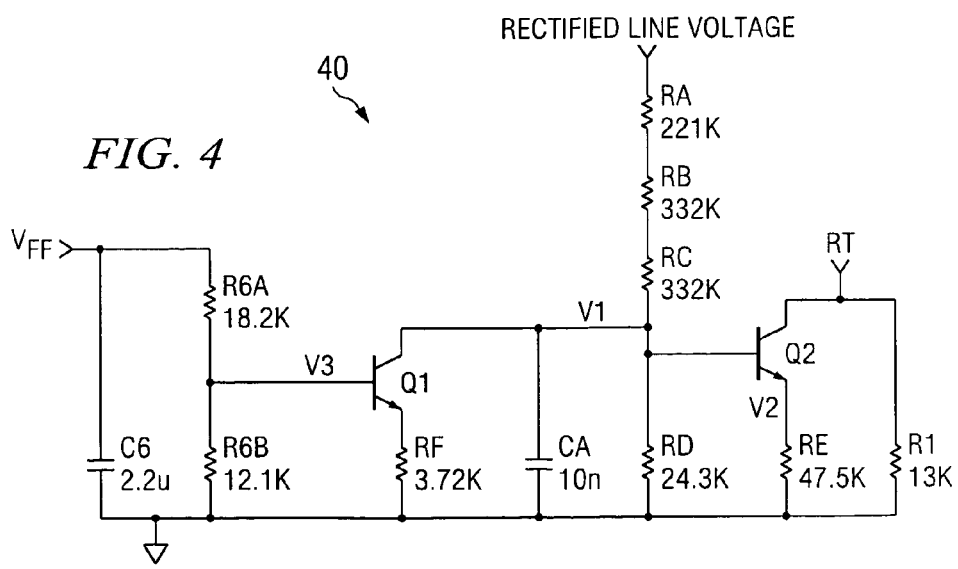
FIG. 4 depicts a control circuit for dithering the oscillator frequency according to one embodiment of the invention.

One embodiment of the present invention is a PWM with additional circuitry such as shown at 40 in FIG. 4. When this circuitry 40 is added to the power converter 10 in FIG. 1, the PWM oscillator frequency (fs) dithers by 20% as a function of the input voltage sine wave. This is advantageously accomplished by varying the charging current of capacitor CT by 20% as the line voltage varies. This may be accomplished by using resistors RA through RE and transistor Q2 to vary the oscillating timing circuitry's charging current 20%. Resistor R1 is the timing resistor in FIG. 1. Capacitor CA is used filter out any high frequency switching noise.

Conventional PFC pre-regulators are typically designed for a universal input line voltage of 85V to 265V. These changes in line amplitude would cause changes in the PWM oscillator frequency (fs) if not corrected. A majority of PFC PWM ICs conventionally use a multiplier to shape the input current waveform. The multiplier typically has a voltage feed forward function for power limiting and easier control loop compensation. The voltage feed forward circuitry generates a DC voltage (VFF) that is proportional to the rectified line voltage amplitude. In the UCC3817 control IC, this VFF voltage comes out at pin 8 of the IC and is filtered with resistor and a capacitor.

Advantageously, according to the present invention, the dithering circuitry 10 uses the VFF signal to correct for changes in line amplitude and is accomplished by replacing resistor R6 in FIG. 1 with R6A and R6B and electrical components resistor RF and transistor Q1. As the input voltage amplitude varies with peak line voltage, the VFF signal changes proportionately. The VFF voltage controls the current sink formed by Q1 and resistor RF and sinks any changes in current through resistor RA caused by varying peak line voltage. This function ensures that oscillator frequency fs varies as a function of a rectified input sine wave, and not function of changing line amplitude.

Illustrative Embodiment

In the circuit 40 of FIG. 4, a minimum frequency (fmin) of 80 kHz and a maximum frequency (fmax) of 100 kHz is established, although limitation to these design frequencies is not to be inferred. A timing capacitor CT of 560 pF may be chosen based on the IC's manufacturer data sheet. Equation 1 describes the oscillator frequency behavior of the control IC used in this design, circuit 40, which frequency will vary with different manufacturers.

$$1)\ fs = \frac{0.6}{RT*CT}$$

Resistor R1 is selected for fmin frequency and which is the frequency where the converter operates at line crossover.

$$2)\ R1 = \frac{0.6}{f\min*CT} \approx 13\ k$$

The transistors in this circuit 40 will not see excessive voltage or current, and 2N2222-type transistors may be used for transistors Q1 and Q2. These transistors are setup in this circuit 40 to have a Vce of 500 mV to keep the transistors out of saturation.

Resistor RE is selected based on voltage at RT ($V_{RT}$) and the 500 mV design requirement of Vce and fmax. The voltage at resistor RT is determined by the ICs internal circuitry and can typically be found in the data sheet. The voltage at RT is determined by the ICs internal circuitry and can typically be found in the data sheet. For circuit 40, $V_{RT}$ may be 3V. Resistor RT is the equivalent resistance required to attain fmax, and $I_{RT}$ is the current through resistor RT. $I_{R1}$ and IRE are the currents in resistors R1 and RE respectively.

$$3)\ RT = \frac{0.6}{f\max*CT} \approx 10.7\ k$$

$$4)\ I_{RT} = \frac{V_{RT}}{RT}$$

$$5)\ I_{R1} = \frac{V_{RT}}{R1}$$

$$I_{RE} = I_{RT} - I_{R1} \quad\quad 6)$$

$$7)\ RE = \frac{V_{RT} - Vce}{I_{RE}} \approx 47.5\ K$$

The components for the divider are formed by resistors RA through RD. The peak voltage at the base of Q2 (V1) may be 3.2V, and is calculated with the use of equation 8. Voltage Vbe for this design may be roughly 0.6V.

$$V1 = V_{RT} - Vce + Vbe \quad\quad 8)$$

The voltage divider resistors can be selected based on equation 9 trying to minimize loss. Vinmin is the minimum RMS line voltage of 85V for this illustrative embodiment. The rectified line voltage is obtained by connecting to the output of diode bridge D3 in the schematic of FIG. 1.

$$9)\ \frac{V1}{RD} = \frac{Vin\min\sqrt{2} - V1}{RA + RB + RC}$$

To prevent frequency fs from varying with line amplitude, components RF, R6A, R6B and Q1 are properly selected. The determining factors on selecting these components are changes in current though resistor RA caused by varying line amplitude variations in the VFF signal. The changes in current through resistor RA are denoted by variable $I_{RA}$. The design of the power converter determines the VFF signal. In this circuit 40, signal VFF varies proportionally with the line voltage from 1.4 V to 4.2 V. Resistor R6 is also determined by the design requirements and is 30 K ohms. To implement the frequency dithering, resistor R6 in FIG. 1 is replaced with resistor R6A and R6B of FIG. 2. These two resistors can be sized with equations 10 and 11.

$$10)\ R6B = \frac{Vbe*R6}{VFF\min} \approx 12.1\ k$$

$$R6A = R6 - R6B \approx 18.2\ k \quad\quad 11)$$

Transistor Q1 and resistor RF form a controllable current sink that suppresses the excess current caused by changing peak line voltages. The resistor RF is selected based on the maximum VFF voltage (VFFmax) and the change in peak current as the line varies between the minimum (Vinmin) and the maximum (Vinmax) RMS input voltages. The following equation 12 can be used to select RF for proper current sinking.

$$12)\ RF = \frac{VFF\max \times \frac{R6B}{R6A+R6B} - Vbe}{\frac{Vin\max \times \sqrt{2} - Vin\max \times \sqrt{2}}{RA+RB+RC}} \approx 3.72\ k$$

Figure 5:
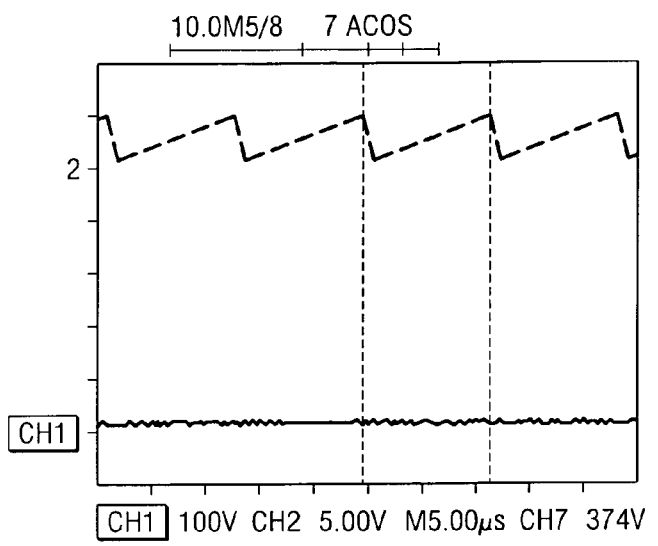
FIGS. 5–7 depict the oscillator frequency varying with the rectified line voltage. This shows that the dithering circuit does what it was designed to do.
Figure 6:
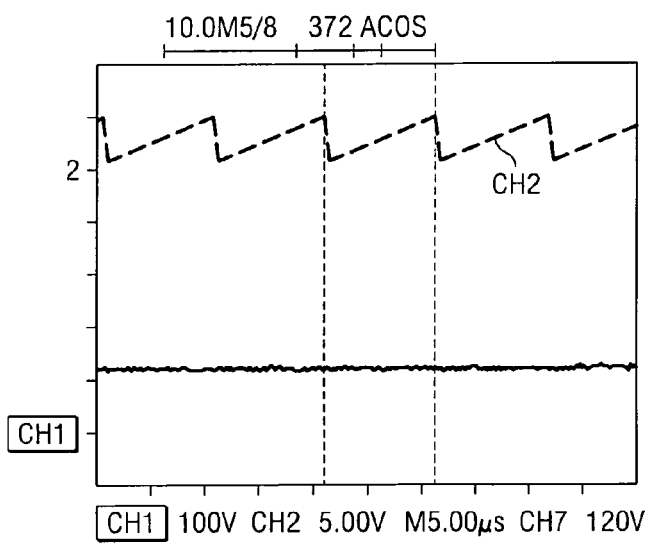
Figure 7:
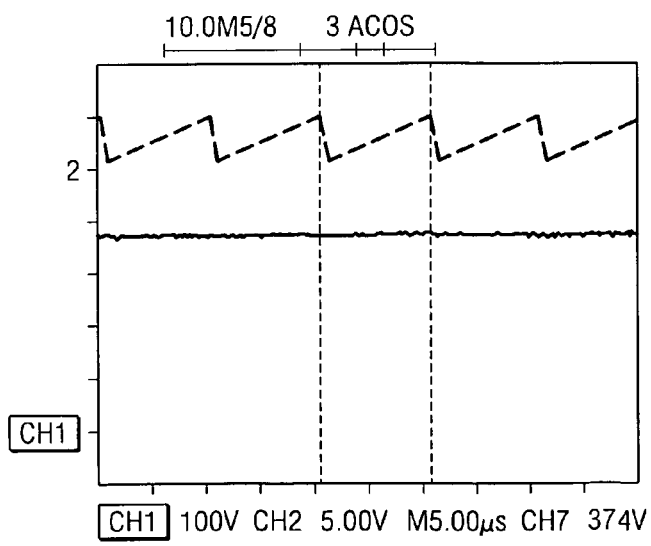

The circuit 40 in FIG. 4 is shown added to the circuitry 10 in FIG. 1 and the oscillator frequency dithers as a function of the rectified sine wave input voltage and does not vary with the changes in line amplitude. FIGS. 5 through 7 show the oscillator frequency varying with rectified line voltage, where CH1 is the rectified line voltage and CH2 is the PWM oscillator frequency. The oscillator frequency varies with the input from 82 kHz to 100 kHz.

Advantageously, this frequency dithering circuit and method takes advantage of the internal timing circuitry that is found in most PWMs. This technique is a cost effective solution for lowering narrowband EMI.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A pulse width modulator (PWM), comprising:
   circuitry configured to receive an input signal at an input and generate a pulse width modulated output signal having a switching frequency at an output; and
   control circuitry controlling the switching frequency as a function of a rectified sine wave input signal,
   wherein the control circuitry is configured to dither the switching frequency by varying a charging current for a timing capacitor of an oscillator with a current path parallel to a timing resistor of the oscillator where the current path is controlled by a voltage divided from said rectified sine wave input signal.

2. The pulse width modulator as specified in claim 1, wherein the control circuitry is configured to dither the switching frequency without the requirement of a remote controller.

3. The pulse width modulator as specified in claim 2, wherein the control circuitry is configured to dither the switching frequency up to about 20%.

4. The pulse width modulator as specified in claim 1, wherein the control circuitry is configured to generate a voltage feed forward (VFF) signal that is proportional to the rectified sine wave input.

5. The pulse width modulator as specified in claim 4, wherein the control circuit comprises a transistor configured to sink a current as a function of the VFF signal.

6. The pulse width modulator as specified in claim 5, wherein the transistor sinks the current as a function of a varying peak line voltage of the input.

* * * * *